United States Patent [19]
Neely

[11] 3,955,795
[45] May 11, 1976

[54] VALVE

[75] Inventor: Raymond J. Neely, Montgomeryville, Pa.

[73] Assignee: Refreshment Machinery Incorporated, Warminster, Pa.

[22] Filed: Nov. 15, 1973

[21] Appl. No.: 415,878

[52] U.S. Cl. ............................. 251/129; 251/152; 251/333
[51] Int. Cl.² ........................................ F16K 31/02
[58] Field of Search .......... 251/129, 141, 152, 333, 251/367

[56] References Cited
UNITED STATES PATENTS

| | | |
|---|---|---|
| 1,049,845 | 1/1913 | Geissinger ...................... 251/129 X |
| 1,389,056 | 8/1921 | Lane .................................... 251/129 |
| 1,968,957 | 8/1934 | Musgrave ........................ 251/129 X |
| 2,569,027 | 9/1951 | Stoner .............................. 251/129 |
| 2,828,937 | 4/1958 | Kreitchman ....................... 251/129 |
| 3,098,635 | 7/1963 | De la porte et al. ............. 251/129 X |
| 3,321,177 | 5/1967 | Fendel et al. .................... 251/152 X |
| 3,325,139 | 6/1967 | Diener et al. ...................... 251/129 |
| 3,469,590 | 9/1969 | Barker ............................ 251/129 X |
| 3,510,103 | 5/1970 | Carsello ............................ 251/333 |
| 3,510,814 | 5/1970 | Nordfors ........................ 251/141 X |

*Primary Examiner*—Charles J. Myhre
*Assistant Examiner*—Ira S. Lazarus
*Attorney, Agent, or Firm*—Seidel, Gonda & Goldhammer

[57] ABSTRACT

A valve which comprises components which can be assembled and disassembled by hand and which can discharge a relatively large volume of hot water in a few seconds.

11 Claims, 4 Drawing Figures

U.S. Patent May 11, 1976 3,955,795
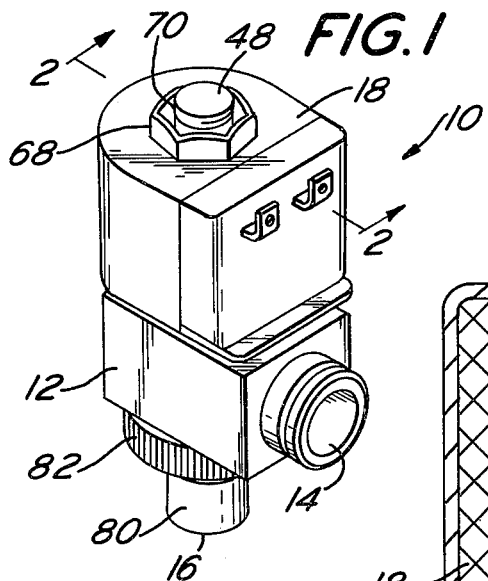
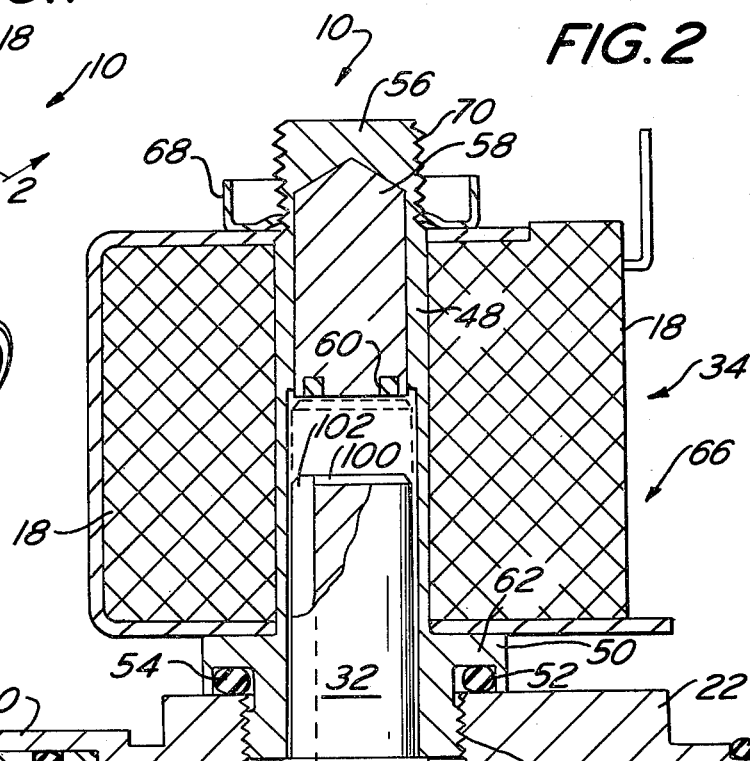
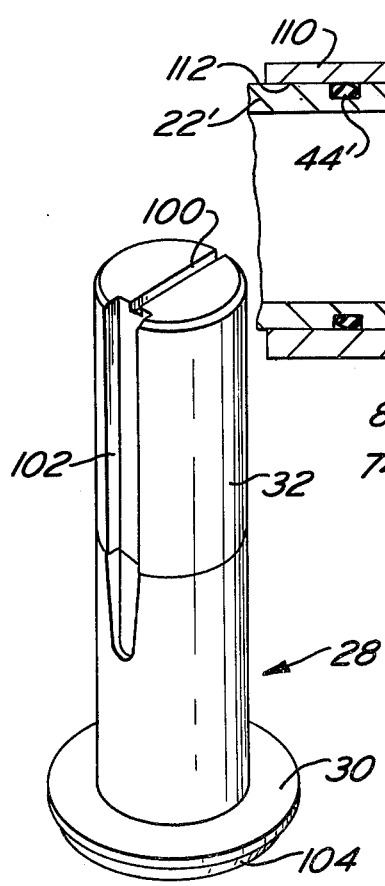
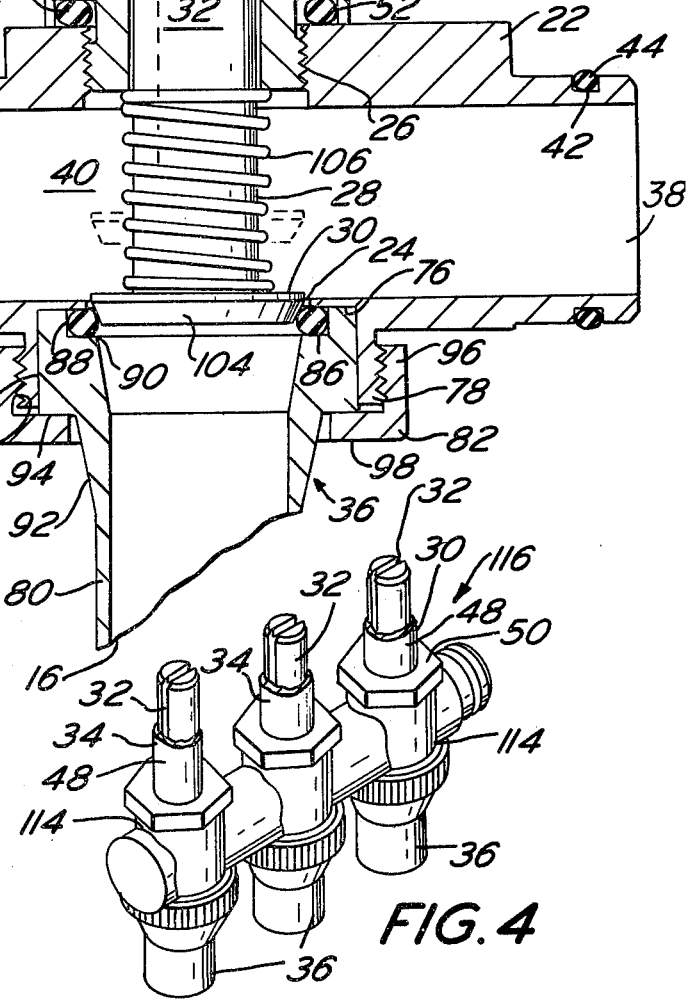

VALVE

This invention relates to a valve and more particularly to a self-cleaning valve which can be readily disassembled and assembled by hand and which can discharge a large quantity of hot water in a short period of time.

For the most part, valves presently available on the industrial market for discharging water at high temperatures will not function properly after they have gone through a few thousand cycles when used in areas having water with a high mineral content. Most of these valves are of the discharge type. In these valves, a build up of minerals usually occurs at the point where the diaphragm seals to the seat and causes interference with the proper seating. This allows the valve to leak. Materials presently used in diaphragms within these valves deteriorates or changes its elastic or flexural property under temperatures in the range of about 212° F. This deterioration is aggrevated by the minerals in the water. The result invariably is partial or complete failure of the valve.

Thus, the valve disclosed herein may be used with high temperature water (on the order of 212° F.) having a high mineral content. It includes structure which enables accumulated mineral deposits to be wiped off the valve head every time the valve is closed so thaat the valve head seats properly on the sealing ring. The valve is designed so that it can be readily assembled and disassembled by hand to permit any of its components to be replaced or serviced. Still further, the valve is capable of dumping 250 cubic centimeters of water with a four inch pressure head in a maximum time of two seconds.

Generally, the valve comprises a valve body with first and second apertures therein. A valve member having a stem and a valve head is located on the valve body so that the stem extends through the second aperture. Means for moving the valve member away from the first aperture so that liquid can flow therethrough is provided.

The invention can best be described by referring to the accompanying drawing wherein a presently preferred form thereof is illustrated and wherein FIG. 1 is a perspective view of an assembled valve constructed in accordance with the present invention.

FIG. 2 is a sectional view taken along line 2—2 of FIG. 1.

FIG. 3 is a perspective view of the valve member used in the valve.

FIG. 4 is a perspective view of another form of the invention.

Referring to the drawings in detail, a valve 10 comprising a valve body 12 having an inlet opening 14 and a discharge opening 16 is shown. Supported on the valve body is the coil 18 of a solenoid as will be described herein. Connectors 20 may be connected by suitable wires to any source of current for energizing coil 18.

Referring to FIG. 2 the valve body 12 is a hollow member having first and second oppositely located apertures 24 and 26 in annular wall 22. A valve member 28 having a valve head 30 and a valve stem 32 is provided. Means for moving the valve member 34 is connected to the second aperture 26 in a manner which will be explained herein.

A discharge assembly 36 is connected to the valve body 12 at the first aperture 24.

The valve body includes an opening 38 at one end and an opening 40 at the opposite end. The annular wall adjacent opening 38 has a reduced diameter for a reason which will be explained. The outer surface of wall 22 adjacent opening 38 has a circumferential groove 42 in which an annular sealing ring 44 is received.

The second aperture 26 is internally threaded in order to threadingly receive the means for moving the valve member 34. That means comprises an elongated sleeve 48 which is threaded at one end so that it can be threadingly received within the second aperture 26. It includes an outwardly directed flange 50 and a downwardly directed lip 52 supported by flange 50. A sealing ring 54 is disposed between the flange and lip and the annular wall 22 of the valve body. The end of the sleeve 48 remote from flange 50 may be closed by a plug. In the alternative, if the sleeve is formed by boring a hole in a solid piece of material, the hole may be blind to leave a portion of the original stock 56 in place. A pole piece 58 is disposed immediately adjacent the blind end of the opening in the sleeve. Built into the pole piece is an annular shading pole 60. As will be made clearer herein, the pole piece 58 and shading pole 60 form the permeable core of a solenoid which is energized to displace the valve member from the position shown in solid lines in FIG. 2 so that liquid can flow through the valve body.

A coil assembly 66 which includes coil 18 and nut 68 is supported on the upwardly facing surface 62 of flange 50. The nut 68 is threadingly received over threads 70 at the upper end of sleeve 48 to retain the coil thereon.

The nut 68 may have a knurled outer surface of sufficient diameter so that it can readily be gripped and tightened or loosened by hand.

The valve body 12 includes a downwardly directed flange 74 which is spaced radially outwardly from the first aperture 24. The annular wall 22 within the flange 74 defines a bearing surface 76. The outer surface of the downwardly directed flange 74 is threaded as at 78.

The discharge assembly 36 is connected to the valve body adjacent first aperture 24. The discharge assembly includes a discharge spout 80 and a threaded fastener 82.

The discharge spout 80 is a hollow member having a first cylindrical wall portion 84 which is telescopically received within flange 74. The end of wall portion 84 lies against bearing surface 76. The upper part of wall portion 84 is cut out to define a ledge 86. Ledge 86 is substantially coextensive with the part of the annular wall 22 immediately adjacent first aperture 24 to form a notch 88 in which an annular resilient sealing ring 90 is received. The sealing ring is operative to seal the juncture between the discharge spout 80 and the annular wall 82. Additionally, the sealing ring 90 is large enough so that its internal diameter extends radially inwardly of the first aperture 24.

The wall portion 84 is connected to a second wall portion 92 by an inwardly directed ledge 94. The spout has an elongated opening therethrough which terminates in discharge opening 16.

The threaded fastener 82 includes a cylindrical portion 96 having internal threads which supports an inwardly directed lip 98. When the threaded fastener is tightened on the downwardly directed flange, lip 98 bears against ledge 94 so that the spout is urged upwardly into sealing engagement with the annular wall.

The outer surface of the cylindrical portion 96 may be knurled. It is of sufficiently large diameter so that it can be grasped and tightened and loosened by hand.

Referring to FIG. 3, the valve stem 32 is an elongated cylindrical member. It may be made of stainless steel which is coated with plastic such as polytetrafluoroethylene, or the stem may be made of stainless steel and the head may be molded therein from a suitable plastic. Its diameter is slightly smaller than the internal diameter of sleeve 48 so that it can move axially therein. Pressure relief grooves 100 and 102 are formed in the top and side walls respectively of the valve stem.

The valve head 30 is slightly smaller in diameter than aperture 24 in the valve body. It includes a downwardly directed frustum the side wall of which defines inwardly beveled surface 104 which is adapted to lie against resilient sealing ring 90 in sealing relation thereto to prevent flow through the valve. The relationship between the valve head and the sealing ring enables the valve head to be cleaned each time the valve is closed as will be explained herein.

When the valve member 28 is installed in the valve body, a helical compression spring 106 is disposed between the back face of valve head 30 and the lower face of sleeve 48. This biases the valve into sealing engagement with sealing ring 90. changing the As valve member 28 moves downwardly into sealing contact with ring 90 it first meets ring 90 at a circumferential line contact. Then due to the inwardly beveled surface 104 of valve head 30 and the continuing applied force of spring 106 it continues to move downwardly. Resilient sealing ring 90 moves outwardly due to beveled surface 104 changing the line contact to circumferential surface contact and causing any deposits to be wiped from surface 104. When valve is again energized and valve member 28 moves upwardly, seal ring 90 having an elastic memory, returns to its original state of position.

If after repeated cycling seal ring 90 should take a set or become slightly deformed decreasing the amount of wiping action, discharge spout 80 can be removed and seal ring 90 inverted which will then use the opposite and unused side of seal ring 90 giving the same effect as a new seal and seat.

To operate the valve, valve body 12 is connected to a source of liquid. Advantageously, it may be telescopically received within the discharge pipe of a hot water heater. The sealing ring 44 assures that such a connection will be water tight. Suitable electrical conductors are connected to connectors 20. Prior to energization, the valve is in the configuration illustrated in FIG. 2. Thus, hot water enters the valve body through opening 38. However, it cannot be discharged from the valve body because spring 106 urges the valve head into sealing engagement with sealing ring 90 to close aperture 24 and the discharge spout 80.

When coil 18 is energized, the valve member 28 is moved upwardly in sleeve 48 against the force of spring 106 to the position shown in phantom. Liquid will flow through the valve body and out aperture 24 and through the discharge spout 80 as long as the coil 18 is energized. Upon de-energization of the coil 18, spring 106 returns the valve to its sealed position. Liquid which may be trapped above the valve stem 32 is permitted to drain therefrom by way of pressure relief grooves 100 and 102.

The valve can be readily assembled and disassembled without any tools.

Thus, the discharge assembly 36 and valve member 28 are removed by removing threaded fastener 82 from flange 74. This permits the discharge spout 80 and the sealing ring 90 to be removed. Since the valve head 30 is smaller than aperture 24, the valve member 28 drops out of the valve body. Spring 106 can then be removed from the valve stem 32.

Coil 18 can be removed from sleeve 48 by merely removing nut 68. The coil than slips off the sleeve 48.

The sleeve 48 itself can be easily removed from the valve body by being unscrewed from aperture 26 in annular wall 22. Removal of the sleeve 48 permits sealing ring 54 to be removed.

It is believed that in view of the foregoing explanation, it is not necessary to describe the manner of assembling the valve 10.

A number of similar valves 10 may be connected serially to each other so that liquid may fill all of the valve bodies 12 at the same time. In this configuration, only those valves 10 that are energized will have liquid discharged therefrom.

To this extent, the valve body 12 has an extension 110. The internal diameter 112 of the extension 110 is only slightly larger than the external diameter of the reduced portion of annular wall 22' of the next adjacent valve. Thus, that reduced portion can be slipped within the extension 110 and sealed against the leakage of liquid by sealing ring 44'. It is apparent that as many valves 10 as desired can be assembled in end-to-end relation.

Still further, it is contemplated that a plurality of valve bodies 114 each having the configuration illustrated in FIG. 2 may be formed at regular intervals in a piece of bar stock 116 as seen in FIG. 4. To this extent, the valve bodies may be formed at regular intervals on the bar stock. Each valve body would include first and second apertures 24 and 26. The discharge assemblies 36 would be connected to first apertures 24 while the means for moving the valve member 34 (only a portion of which is shown) would be connected to the second aperture 26. Such valves would operate in precisely the same manner as disclosed above.

Valves constructed in accordance with the disclosure herein are capable of dumping 250 cubic centimeters of water in up to two seconds as explained above. This is accomplished even though the diameter of aperture 24 is 0.75 inches, the diameter of inlet opening 38 is 0.62 inches and the distance from the front of the valve body 12 at opening 38 to aperture 24 is less than 2.10 inches.

While the invention has been described with reference to certain forms thereof, it is apparent that other forms and embodiments will be obvious to those skilled in the art in view of the foregoing description. Thus, the scope of the claims should not be limited by that description but, rather, only by the claims appended hereto.

I claim:

1. A valve comprising a valve body having a flow passage means communicating with the interior thereof, said body including an annular wall having first and second apertures, a valve member having a valve stem, said valve member including a valve head for closing said first aperture, said stem being connected to said valve head and extending through said second aperture, means for moving the valve member toward and away from said first aperture, said last named means including a sleeve, one end of said sleeve being threadedly connected to said valve body at said second aperture, said valve stem extending into said sleeve and being axially movable therein, energizable means having first and second parts, a first part of said energizable means being disposed within said sleeve, the second part of said energizable means surrounding said sleeve, said energizable means being operative to displace said valve member away from said first aperture when energized to permit a fluid to flow from said valve body through said first aperture, spring means biasing said valve member towards said first aperture, means for threadingly retaining said second part of said energizable means on said sleeve so that said means for moving said valve member can be easily separated from said valve body and said second part of said energizable means can be separated from said sleeve, an outwardly directed flange on said valve body surrounding said first aperture, a discharge spout, said discharge spout being telescopically received with said flange, a fastener interconnected between said flange and spout for releasably retaining said discharge spout in assembled relationship with said flange in a manner so that said discharge spout can be easily separated from said flange on said valve body, a sealing ring disposed between said valve body and discharge spout to provide a seal therebetween, said sealing ring having an exposed portion in said first aperture, said first aperture having transverse dimensions greater than the transverse dimensions of said valve head so that said valve head can extend therethrough for sealing contact with the exposed portion of said sealing ring.

2. A valve in accordance with claim 1 wherein said fluid flow passage means includes first and second openings on said valve body, said first aperture being located between said first and second openings.

3. A valve in accordance with claim 2 wherein said sleeve extends entirely through said second part of said energizable means which is located at an elevation below the upper end of said sleeve, said means for threadedly retaining said second part of said energizable means including a nut threadedly connected to the upper end of said sleeve and engaging an upper surface on said second part of said energizable means.

4. A valve in accordance with claim 2 wherein said valve body is cylindrical at each of said openings, said openings being concentric, the inner diameter of said body at said first opening being less than the inner diameter of said body at said second opening, and the outer diameter of said body at said first opening being less than the outer diameter of said body at said second opening.

5. A valve as defined in claim 1 wherein said passage means includes first and second oppositely disposed openings in said valve body, the inside diameter of said valve body at said second opening being of sufficient size to telescopically and sealingly receive a portion of the outer surface on a second identical valve body so that two such valve bodies may be interconnected in series.

6. A valve as defined in claim 1 wherein said discharge spout includes a downwardly facing ledge, said flange having threads on its outer surface, and said threaded fastener comprises a cylindrical portion for threadingly engaging said threads and a radially inwardly directed lip for engaging said ledge.

7. A valve as defined in claim 6 wherein an inwardly facing notch is defined at the juncture of said valve body and said discharge spout, a sealing ring disposed in said notch for sealing said juncture, and the inner peripheral surface of said sealing ring extends into said first aperture to be engaged by said valve head when said first aperture is closed.

8. A valve as defined in claim 1 wherein an intermediate portion of said sleeve includes an outwardly directed flange and a sealing ring disposed between said flange and said valve body to seal the threaded connection therebetween.

9. A valve as defined in claim 1 wherein said valve stem includes an axially directed channel formed in its wall for permitting liquid trapped between said valve stem and the upper end of said sleeve to flow into said valve body.

10. A valve as defined in claim 1 wherein said first part of said energizable means includes a core which is permeable to magnetic fields, said second part of said energizable means includes an electric coil for creating lines of magnetic force through said core, and said means for threadingly retaining said coil comprises a nut which is threaded onto said sleeve.

11. A valve as defined in claim 1 including a groove in the outer surface of said annular wall adjacent said passage means, and a sealing ring disposed in said groove.

* * * * *